Patented Apr. 7, 1942

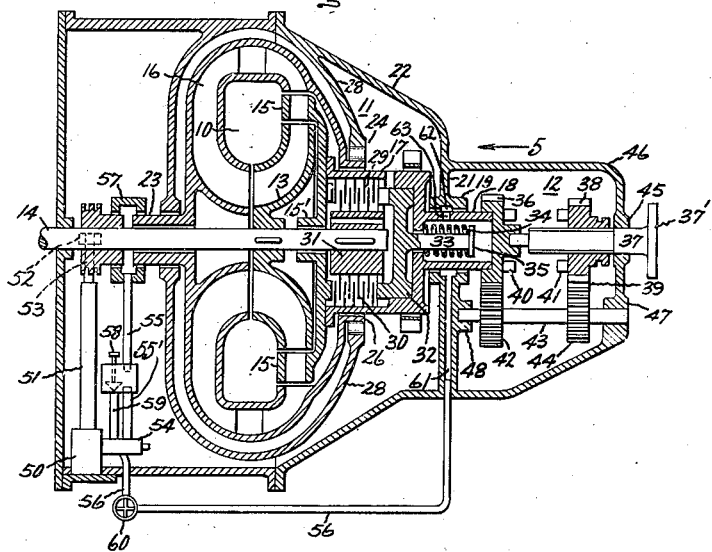

2,279,019

UNITED STATES PATENT OFFICE 2,279,019

HYDRAULIC VEHICLE POWER TRANSMISSION

Willy Black, Berlin-Halensee, Germany, assignor to General Electric Company, a corporation of New York Application November 27, 1939, Serial No. 306,369
In Germany December 8, 1938

5 Claims. (Cl. 192—3.2)

My invention relates to automotive vehicle transmissions of the hydraulic type and more particularly to the type including hydraulic gear such as described in United States Patents 1,199,359 and 1,199,361 issued to Föttinger.

One object of my invention is to provide an improved power transmission whereby stalling of the prime mover under varying vehicle operating conditions is substantially eliminated.

For a better understanding of my invention together with other and further objects thereof reference is had to the following description taken in connection with the accompanying drawings, and its scope will be pointed out in the appended claims.

Figure 7:
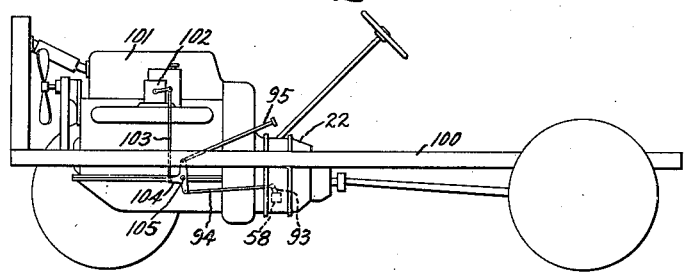
Figure 6:
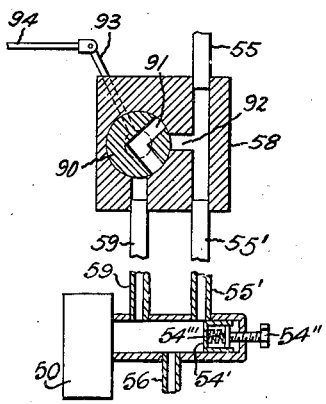
Figure 5:
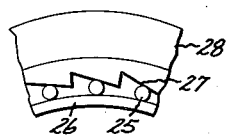

In the accompanying drawings Fig. 1 illustrates in vertical cross section a vehicle power transmission built in accordance with my invention. Fig. 2 is a diagram indicating the operating characteristics of the transmission illustrated in Fig. 1. Figs. 3 and 4 illustrate enlarged sectional and plan views, respectively, of a control mechanism applied to the transmission of Fig. 1; Fig. 5 is a fragmentary sectional view of a detail of Fig. 1; Fig. 6 illustrates a modification of a control element of Fig. 1 and Fig. 7 is a side view of a vehicle having a hydraulic transmission provided with the modified control element illustrated in Fig. 6.

The transmission illustrated in Fig. 1 consists generally of a hydraulic torque converter 10, a mechanical coupling 11 and a reversing gear 12. The converter includes a pump wheel 13 mounted upon a drive shaft 14, a turbine wheel 15 and a guide wheel 16. The turbine wheel 15 is attached to a housing 17 of the mechanical coupling 11 and is centered about the shaft 14 by its hub 15'. This housing 17 is integral with and is supported by a driven shaft 18 which is a hollow shaft projecting through and supported by a bearing 19. The bearing 19 is in turn supported in a wall 21 of a transmission housing 22. The guide wheel 16 is in the form of a casing surrounding the pump and turbine wheels and forming with these wheels a fluid circuit in which the fluid, preferably oil, is circulated to transmit energy between the pump and turbine wheels. The guide wheel is supported at one end by a sleeve 23 rotatable about and supported on shaft 14. It is supported at its other end by a unidirectional brake 24 a fragment of which, looking in the direction of arrow "5" in Fig. 1, is shown in Fig. 5. This brake may be of any suitable construction which permits the wheel to rotate in only one direction. Fig. 5 illustrates a simple form of such brake comprising rollers 25 mounted between a sleeve 26, which is integral with the guide wheel 16, and teeth 27 mounted on a wall 28 of the casing 22. In operation the rollers are wedged between the teeth and the sleeve 26 to stop the guide wheel when there is a force tending to turn the guide wheel in a clockwise direction looking in the direction of arrow "5" in Fig. 1. When this turning force is reversed, the guide wheel moves the rollers into the notches between the teeth and thereby is freed to rotate in that direction.

Clutch 11 consists of plates 29 attached to the inner surface of the casing 17 and of co-operating plates 30 attached to a hub 31 mounted on the drive shaft 14. The clutch plates are normally out of engagement with each other so that the turbine wheel rotates free of the drive shaft. A piston 32 is provided in the end of the casing 17 to effect an engagement of the two sets of clutch plates. The piston 32 is provided with a stud shaft 33 normally projecting into the hollow shaft 18. This shaft and the piston are held in this position by a spring 34 placed under compression between a disk 35, attached to the end of the shaft 33, and the end wall separating the casing 17 from the hollow shaft 18. The piston is moved forward to effect an engagement of the clutch plates by oil supplied under pressure to the hollow shaft 18.

Reversing gear 12 includes a gear 36 attached to the end of the hollow shaft 18. This gear supports the end of a driven shaft 37 upon which a gear 38 is mounted. The gear 38 is keyed to shaft 37 but is axially movable relatively to the shaft. The gears 36 and 38 are provided with clutch teeth 40 and 41 on adjacent surfaces, respectively, whereby a direct mechanical connection may be made between the shafts 18 and 37 by sliding the gear 38 upon the shaft 37, until the teeth 40—41 engage. Reverse operation of the shaft 37 is obtained by moving the gear 38 by any suitable means (not shown) to disengage the teeth 40 and 41 and into engagement with a gear 39 of the reversing gear train. The complete train of reversing gears includes the gear 42 mounted on a jack shaft 43 and engaging the gear 36. A second gear 44 also mounted on jack shaft 43 engages a gear 39 which in turn drives the gear 38. The driven shaft 37 is supported at its outer end in a bearing 45 located in the end wall of the reverse gear casing 46 and is provided with a suitable coupling plate 37'. The jack shaft 43 is supported at one end in a bearing 47 in the end wall of the reverse gear housing 46 and is supported at the other end in a bearing 48 in the wall 21 of the housing 22. The gear 39 is mounted on a suitable shaft in back of shaft 43 and is not visible in this view.

Operating fluid, preferably oil, is supplied to the hydraulic gear and to the mechanical clutch piston by a positive displacement pump 50 driven by a shaft 51 through a worm pinion 52 attached to the end of the shaft and through a co-operating worm gear 53 mounted on the drive shaft 14. The pump is provided with a suitable pressure adjusting relief valve 54 through which oil is supplied to a conduit 55', 55 leading to the hydraulic gear and to a conduit 56 leading to the clutch piston. The function of the relief valve 54 is to regulate the opening to the conduit 55'. Any suitable valve may be used for this purpose. In Fig. 6 an example of such valve is shown diagrammatically. In this valve a piston 54' is positioned by an adjusting screw 54" to regulate the passage of oil from the valve housing to the conduit 55'. The piston 54' is positioned to restrict the opening into the conduit 55' and thereby enables the pump to build up a pressure in the conduit 56.

A spring 54''' placed between the piston 54' and the adjusting screw 54" enables the oil to move the piston relatively to the screw in response to oil pressure variations thereby to vary the opening into conduit 55' and to maintain a constant oil pressure in the conduit 56.

The conduit 55', 55 conducts oil to the hydraulic gear. It is connected to an annulus 57 surrounding the shaft 14 at a point between the worm gear 53 and the end of sleeve 23. Oil space is provided in the sleeve 23 so that oil may flow from the annulus 57 into the guide wheel 16 and from there through a clearance space between the guide wheel and the pump wheel into the hydraulic gear fluid-circuit. The pump 50 is also provided with a bleeder or by-pass conduit 59 and a valve 58 which may be adjusted by hand to relieve and to regulate the pressure in the conduit 58 and to conduit the by-passed fluid to any suitable space. In the illustrated example it is conducted to the conduit 55 and into the hydraulic gear fluid-circuit.

The conduit 56 directs oil through a control mechanism 60 into the hollow shaft 18 for operating the clutch piston 32. The conduit 56 is, for this purpose, connected to the wall 21 in which a channel 61 is provided to connect the end of the conduit 56 with an annular chamber 62 in the bearing 19. Oil flows from this channel into the hollow shaft 18 through openings 63 registering with the annular channel 62. Oil pressure builds up in back of the piston 32 by oil flowing from the hollow shaft through a clearance space around shaft 33 in the dividing wall between the clutch casing 17 and the hollow shaft 18.

In the diagram of Fig. 2 the oil pressure P delivered by the pump 50 as well as the quantity Q of oil delivered are plotted against $n$ the number of revolutions of the pump, the number of revolutions being proportional to the speed of the drive shaft 14. The quantity Q is a straight line characteristic increasing in substantially direct proportion to the revolutions $n$. At increasing speed of the pump the total output thereof flows through the conduit 59 while constant pressure is maintained in conduit 56. The pressure P rises as the square of the speed until the full pressure is reached at a corresponding speed $n'$. The pressure thereafter remains constant. The fluid Q', which is the total volume discharged by the pump at the maximum pressure, flows through the by-pass valve 58 into the conduit 55. For the closing of the mechanical coupling a minimum pressure P' is required and is obtainable at a speed of $n''$.

During operation of the vehicle with the clutch 11 in closed position, the oil pressure falls as the vehicle slows down. When the speed of the drive shaft falls below the value $n''$, the clutch is permitted to open and thereby to release the motor so that it may operate the vehicle through the hydraulic gear. In so doing the motor load is reduced and a stalling of the motor due to overload is avoided. The value $n''$ is determined by the setting of the valve 58. This valve is adjusted manually and may be adjusted to obtain clutch operation within a predetermined speed range.

The operator of the vehicle is given control of the clutch and hydraulic gear operation, by the device 60 illustrated in Figs. 3 and 4. Fig. 3 is a cross sectional view of the control device, and Fig. 4 is a plan elevation thereof. It includes a manually operated lever 70, which is moved to its dotted line position (Fig. 4) when it is desired to start the vehicle or to operate the vehicle at low speed, that is, through the torque converting hydraulic gear. This same lever is moved to its full line position illustrated in Fig. 4 for high speed operation, that is, through the mechanical coupling. The lever 70 is mounted on the square end 71 of a shaft 72, the shaft 72 being the valve stem of a shut-off valve in the conduit 56. This shaft 72 is turned to shut off the pressure in the clutch cylinder and thereby open the clutch when the lever 70 is moved to its dotted line position. The shaft is turned to open the valve and thereby turn on pressure in the conduit 56 when the lever is moved to its full line position as shown in Fig. 4.

Between the lever 70 and the housing 73 an auxiliary lever 74 is loosely mounted on the shaft 72. The casing 73 carries projecting walls 75 and 76 in which suitable bearings are provided to support the shaft 72. This casing 73 also contains a cylinder 77 in which a piston 78 is moved by oil pressure obtained from the conduit 56 which is connected to the cylinder. The piston 78 is moved against the pressure of a spring 79 and carries a pin 80 which is moved into and out of the path of one end of the auxiliary lever 74. The auxiliary lever is provided at its other end with a projection 81 which may be engaged by the lever 70 to move the auxiliary lever in a counter-clockwise direction against the tension of a spring 82 supported at one end by a lug 83 on the casing 73 and attached at its other end to the lever 74. This spring tends to move the lever in a clockwise direction. In operation, the lever 70 is moved to its full line position, and also moves the auxiliary lever 74 with it, when it is desired to operate the vehicle with the mechanical clutch closed. If the proper speed is available, the pressure in conduit 56 is sufficient to raise the piston against the pressure of spring 79 and thereby move the pin 80 into the path of the auxiliary lever 74. Under this condition, the spring 82 cannot move the auxiliary lever. If, however, the lever 70 is in the full line position of Fig. 4 at a time when the vehicle speed is suddenly reduced so that there is insufficient speed of the vehicle and, therefore, there is insufficient pressure of oil in the conduit 56 to hold the pin in its upper position, the pin 80 will move out of the path of the auxiliary lever 74, and the spring 82 will, accordingly, move the auxiliary lever and the lever 70 through the projection 81, into the dotted line position. It is, therefore, possible for an operator to move the lever 70 to either of its two positions but it is impossible for an operator to leave the lever 70 in this full line position of Fig. 4, his attempts to change the vehicle operation, by moving the lever 70 to this position, being made ineffective as soon as he releases the lever unless the proper oil pressure and the proper speed of the vehicle exists.

In Fig. 6, a modification of the by-pass valve 58 is illustrated. In Fig. 1 this valve 58 is adjusted manually so as to obtain an operation of the clutch at a predetermined speed of the shaft 14. Due to varying operating conditions, however, it is desirable to place this adjustment under the constant control of the vehicle operator, and it is more convenient to place this valve under the control of an operating lever of the motor vehicle, such as the engine accelerator pedal, for example. The accelerator pedal is moved in response to load conditions, and is, therefore, a convenient means for automatically adjusting the valve 58. In Fig. 6, the valve 58 is illustrated as having a rotatable core 90 in which a port 91 cooperates with the port 92 in the body of the valve and controls the area of the fluid opening in accordance with its rotation. This core element 90 is, therefore, provided with a lever 93, by means of which it may be rotated, the end of the lever being attached to a rod 94 which is moved in accordance with the movement of the engine accelerator pedal 95 illustrated in Fig. 7. In the position shown, the valve by-passes a minimum amount of fluid and represents the idling position of the accelerator pedal. In the illustrated example the minimum fluid by-pass position of the valve is the complete shut-off position. When the accelerator is depressed, the lever 93 is moved clockwise, thereby increasing the amount of fluid by-passed through the by-pass conduit 59, and thereby lowering the speed at which the clutch 11 is permitted to open. With this operation of the valve 58, the operation of clutch 11 is under the control of the speed of shaft 14, as well as the torque or load thereon. It is possible thereby to operate a vehicle at low speeds and light load with the clutch closed. This condition would exist when running on level ground at low speeds. Under a constant setting of the valve 58, the low speed of the shaft 14 would require an opening of the clutch. In view of the light load on shaft 14, this is not necessary. On the other hand, at higher speeds, where the load on shaft 14 is high due to the weight of the vehicle, or possibly the grade over which the vehicle is traveling is steep, it is desirable to operate with the clutch open. In view of the accelerator pedal being at its lowest position, and therefore, the valve 58 being at its maximum by-pass setting, the high speed of the shaft 14 is ineffectual to produce enough oil pressure to keep the clutch closed. The accelerator pedal, therefore, is a convenient means for regulating the by-pass valve, or in other words, for determining the operating points at which the clutch is to be closed and opened respectively. Fig. 7 is a side view of a conventional chassis for an automotive vehicle including a frame 100 upon the forward end of which is mounted an engine 101, a fuel carburetor 102 and a fuel regulating lever and rod 103. The fuel regulator is operated by a pedal 95 projecting above the frame 100 and rearwardly of the engine in position to be moved by the foot of the driver. The pedal 95 is connected to one end of a bellcrank 104 which is pivoted at 105 and to the other two ends of which the rods 94 and 103 are connected respectively. The engine drives the vehicle through a transmission such as described in Figs. 1 to 5. It is provided with the adjustable valve of Fig. 6, the rod 94 connecting the bellcrank 104 with the lever 93 of the valve. With this arrangement, the speed at which the clutch 11 is closed varies with the fuel injection to the engine and therefore the load on the engine.

What I claim as new and desire to secure by Letters Patent of the United States is:

1. In a vehicle transmission, the combination of a hydraulic gear, a mechanical coupling, pressure operated means for operating said coupling, a pump driven from a shaft of said transmission and arranged to generate fluid pressure responsive to the speed of said shaft, conduit means connecting said pump to said hydraulic gear and to said coupling operating means, manual means for controlling the operation of said transmission, through said hydraulic gear and through said mechanical coupling alternately, and means responsive to the fluid pressure generated by said pump for effecting a change-over from mechanical coupling operation to hydraulic gear operation at a predetermined speed of the transmission shaft.

2. In a hydraulic gear transmission for vehicles, the combination of a hydraulic torque converter, a mechanical coupling, fluid pressure responsive means for operating said coupling, a pump connected to a shaft of said transmission, a fluid connection between said pump and said operating means, manual control means for controlling the fluid in said connection and thereby effect a transmission of power through said mechanical coupling and through said hydraulic torque converter alternately, and means responsive to the fluid pressure delivered by said pump for effecting a change-over from mechanical coupling operation to hydraulic gear operation when a predetermined fluid pressure in said pump is obtained.

3. In a vehicle transmission, the combination of a hydraulic coupling of the Föttinger type provided with a drive and a driven shaft, a pump wheel mounted on said drive shaft, a turbine wheel connected to said driven shaft, a guide wheel mounted for rotation in only one direction, and a fluid enclosed by said three wheels for transmitting energy between said drive and driven shafts, a mechanical coupling between said drive and driven shafts, a fluid operated piston for mechanically coupling said shafts to effect a direct transmission of power therebetween, a hand-operated lever for initiating the operation of said transmission as a direct coupling, a follow-up lever for normally returning said hand lever to the hydraulic operating position, and fluid operated locking means for said follow-up lever, said locking means preventing the operation of said follow-up lever when a predetermined speed of said drive shaft is obtained whereby under such conditions the manual lever will remain in the position for mechanical coupling operation.

4. In a power plant for an automative vehicle the combination of an engine, a fuel control pedal therefor, a power transmission connected between said engine and the drive shaft of said vehicle including a driving and a driven shaft, a hydraulic gear operable to transmit power between said shafts, a mechanical coupling means responsive to fluid pressure operable to connect said shafts directly to each other, a pump connected to said means and driven by one of said shafts to generate fluid pressure proportional to the speed of said shaft, pressure adjusting means for effecting a closure and opening of said mechanical coupling means at predetermined speeds of said shaft, and means responsive to the operation of said fuel control pedal for changing the adjustment of said pressure adjusting means whereby the operation of said mechanical coupling means is effected at predetermined different speeds responsive to the speed of said shaft and modified by the fuel valve operation for said engine.

5. In a hydraulic gear transmission, the combination of a hydraulic torque converter provided with a drive shaft, a pump wheel mounted thereon, a guide wheel, a driven shaft and a turbine wheel connected thereto, a mechanical clutch connected between said drive shaft and said driven shaft, a hydraulically operated piston for controlling the operation of said clutch, a fluid pump operated by said drive shaft for supplying fluid to said hydraulic gear and to said clutch piston, manually operated means for controlling the opening and the closing of said clutch, means tending to move said manually operated means to the open clutch position, and means responsive to the fluid pressure in said hydraulic gear for making ineffective said last-mentioned means when said fluid pressure reaches a predetermined value proportional to a predetermined speed of said drive shaft.

WILLY BLACK.